United States Patent [19]
Music

[11] Patent Number: 5,164,819
[45] Date of Patent: Nov. 17, 1992

[54] METHOD AND SYSTEM FOR CODING AND COMPRESSING COLOR VIDEO SIGNALS

[76] Inventor: John D. Music, 1523 Ave. Entrada, San Dimas, Calif. 91773

[21] Appl. No.: 679,738

[22] Filed: Apr. 3, 1991

[51] Int. Cl.⁵ ............................................. H04N 7/13
[52] U.S. Cl. .................................. 358/13; 340/701; 358/136
[58] Field of Search ............... 358/13, 135, 136, 433; 340/701

[56] References Cited

U.S. PATENT DOCUMENTS

| | | | |
|---|---|---|---|
| 4,816,901 | 3/1989 | Music | 358/13 |
| 4,847,677 | 7/1989 | Music | 358/13 |
| 4,987,480 | 1/1991 | Lippman | 358/13 |
| 5,047,853 | 9/1991 | Hoffert | 358/13 |
| 5,070,532 | 12/1991 | Faul | 358/433 |
| 5,081,450 | 1/1992 | Lucas | 340/701 |

Primary Examiner—Howard W. Britton
Attorney, Agent, or Firm—Boniard I. Brown

[57] ABSTRACT

A data compression system for reducing the bit rate for transmission of a color television signal to a value that telephone lines and hard wired systems can accommodate employs a two-color plus color bit map block coding scheme which enables a plurality of subsequent compression techniques to be employed in a single system. The two-color block coding inherently compresses the data which is then further compressed by a combination of intra-frame and inter-frame comparisons and compressions and bit map encoding and compressing as well as tolerance based decision compression techniques for reducing the number of bits needed to represent the color changes.

9 Claims, 3 Drawing Sheets

FORMAT FOR COMPRESSION OF BLOCK ENCODED INFORMATION

| | | TOTAL BITS |
|---|---|---|
| COLOR A: | | |
| DIFFERENCE (PREVIOUS FRAME) | xxxxx 00 | 7 |
| DIFFERENCE (PREVIOUS BLOCK) | xxxxx 10 | 7 |
| COLOR VALUE | xxxxx xxxxx xxxxx 1 | 16 |
| COLOR B: | | |
| NO COLOR B AND NO BIT MAP | 11 | 2 |
| DIFFERENCE (PREVIOUS FRAME) | xxxxx 00 | 7 |
| DIFFERENCE (PREVIOUS BLOCK) | xxxxx 10 | 7 |
| COLOR VALUE | xxxxx xxxxx xxxxx 1 | 17 |
| BIT MAP: | | |
| GROUP A | xxx 0 | 4 |
| GROUP B | xxxx 01 | 6 |
| GROUP C | xxxxx 011 | 8 |
| GROUP D | xxxxx 0111 | 9 |
| GROUP E | xxxxx 01111 | 10 |
| GROUP F | xxxxxxxx 11111 | 13 |

| FORMAT FOR COMPRESSION OF BLOCK ENCODED INFORMATION | | |
|---|---|---|
| COLOR A: | | TOTAL BITS |
|    DIFFERENCE (PREVIOUS FRAME) | xxxxx 00 | 7 |
|    DIFFERENCE (PREVIOUS BLOCK) | xxxxx 10 | 7 |
|    COLOR VALUE | xxxxx xxxxx xxxxx 1 | 16 |
| COLOR B: | | |
|    NO COLOR B AND NO BIT MAP | 11 | 2 |
|    DIFFERENCE (PREVIOUS FRAME) | xxxxx 00 | 7 |
|    DIFFERENCE (PREVIOUS BLOCK) | xxxxx 10 | 7 |
|    COLOR VALUE | xxxxx xxxxx xxxxx 1 | 17 |
| BIT MAP: | | |
|    GROUP A | xxx 0 | 4 |
|    GROUP B | xxxx 01 | 6 |
|    GROUP C | xxxxx 011 | 8 |
|    GROUP D | xxxxx 0111 | 9 |
|    GROUP E | xxxxx 01111 | 10 |
|    GROUP F | xxxxxxxx 11111 | 13 |

FIG-3

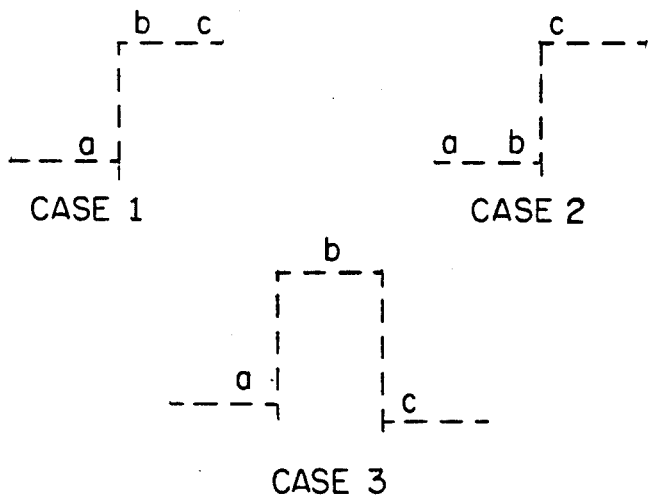

FIG-4

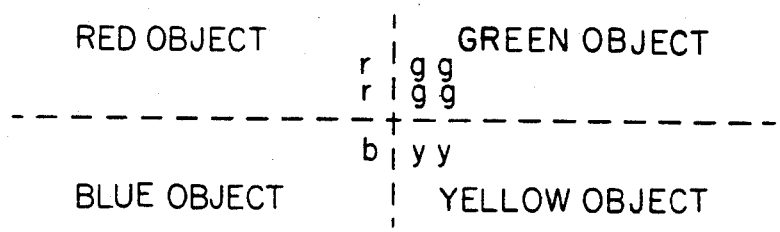
FIG.—5
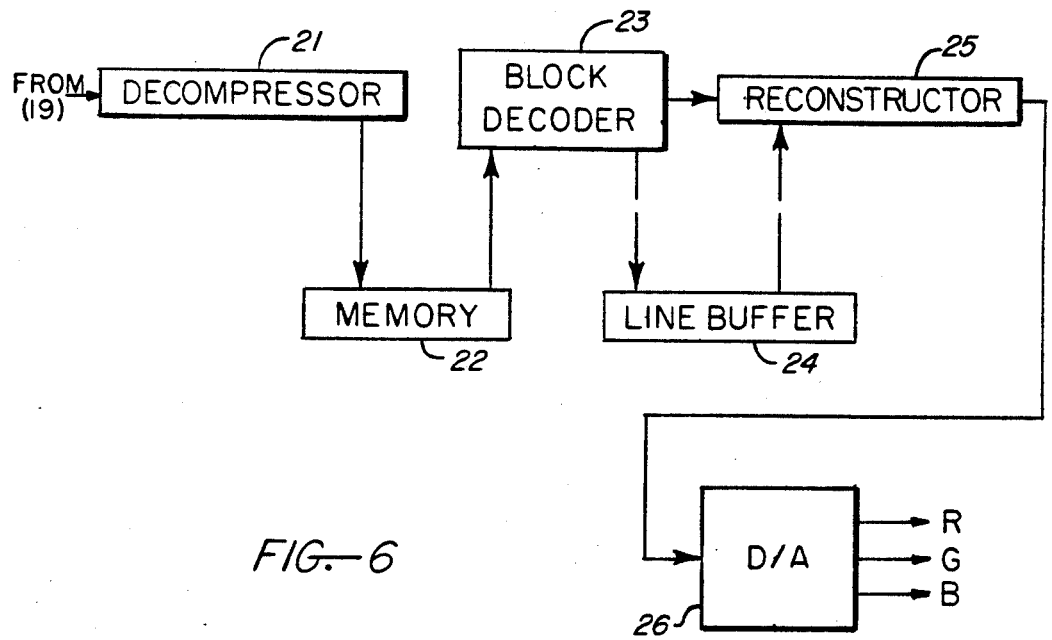
FIG.—6

METHOD AND SYSTEM FOR CODING AND COMPRESSING COLOR VIDEO SIGNALS

BACKGROUND OF THE INVENTION

1. Field of the Invention

This invention relates generally to information signal processing and in particular to the field of processing time sequential information signals such as video signals for the purpose of compressing the amount of information to be transferred from an encoding site to a decoding site, as in transmitting color video imaging signals over hard wire intra-system lines or telephone lines.

2. Prior art

The prior art is summarized by U.S. Pat. Nos. 4,816,901 to J. Music et. al. for a METHOD AND SYSTEM FOR COMPRESSING COLOR VIDEO DATA, March 89; and 4,847,677 to J. Music et. al. for VIDEO TELECOMMUNICATION SYSTEM AND METHOD FOR COMPRESSING AND DECOMPRESSING DIGITAL COLOR VIDEO DATA, July 89.

In the prior art, a three step block coding system for the efficient encoding of TV signals usually involves sampling, transformation and quantization. The transformation step, which most commonly uses the Discrete Cosine Transform method, is a computation-intensive procedure involving matrix multiplication. The intensity of this computational procedure, especially where realtime coding is required, greatly increases the complexity of practical coding schemes.

In order to preserve the spatial resolution and high frequency components of a Television signal it is necessary to sample at a high rate, usually twice the highest frequency component of the signal. In the case of standard broadcast television, this is a sample rate of around 9 megahertz. This results in approximately 500 samples per horizontal scan line and about 120,000 samples per TV field or 240,000 samples per TV frame. If each sample is 15 bits, this results in about 3.6 million bits per frame or 108 million bits per second.

The bit rate must be reduced for applications planned for the future.

SUMMARY OF THE INVENTION

A color video communications system in accordance with this invention transmits encoded compressed R G B color data over a link consisting of an encoder-compressor and a decompressor-decoder. The encoder-compressor in accordance with this invention, bypasses the need for the complex Discrete Cosine Transformation step and substitutes a relatively simple set of logic for finding, characterizing and efficiently coding the non-redundant information.

In the invention, the video signal is digitized and coded into blocks of two-color picture elements (pixels) and a BitMap and a frame map. These blocks and frames can be easily checked for redundancies. The novel encoder-compressor function of the system of this invention removes both the inter-block redundancies, and inter-frame redundancies to reduce the digital data needed to represent the video signal. The long run lengths of redundant information are not transmitted since this information is restored at decoding and reconstruction from the BitMap and frame map information.

The encoding process involves four major steps after digitization of the analog signal:

(1) Block coding individual blocks (matrices of pixels);
(2) Inter-frame filtering to remove noise and establish a common level between frames to avoid edge effects;
(3) Inter-frame comparison to remove redundancies; (4) Compression for removing all redundancies interframe and inter-block.

The decoding process involves the steps of (1) Decompression to obtain run length data; (2) Block decoding to obtain color luminosities and chrominances; (3) Reconstruction of the digital signal frames for reconversion to analog.

BRIEF DESCRIPTION OF THE DRAWINGS

FIG. 3 is a table illustrating the format for compression of the block encoded information.

FIG. 4 is a diagram illustrating the premise of the intersection of four different colors within the block.

FIG. 5 is a diagram illustrating non-redundant elements in a block.

FIG. 6 is a block diagram of the decoder-decompressor.

DETAILED DESCRIPTION OF THE PREFERRED EMBODIMENTS

Figure 1:
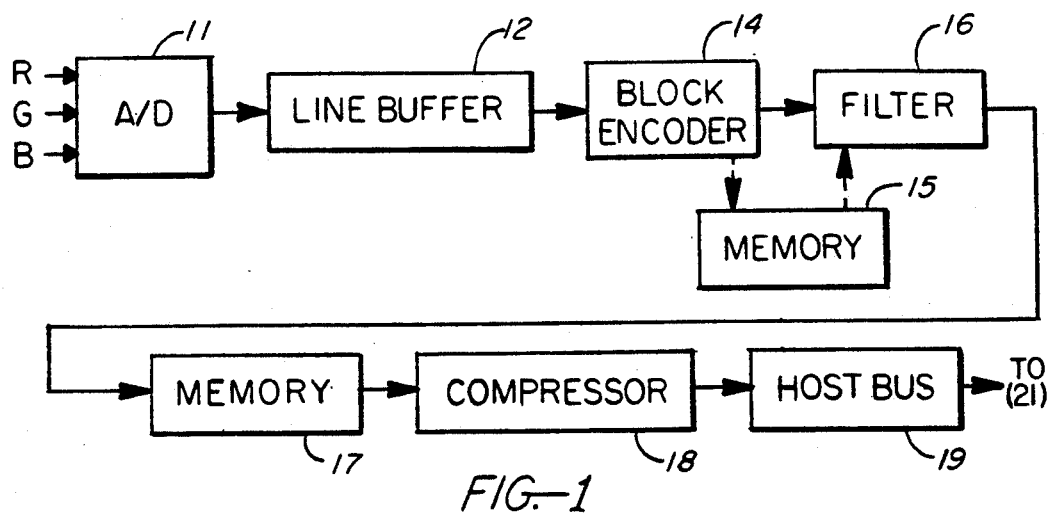
FIG. 1 is a block diagram of the encoder-compressor.

Reference is directed to the block diagram of the encoder-compressor, FIG. 1. The RGB data output from any NTSC formatted device such as a video camera, disk player or video cassette player, for example, is an analog signal that can be digitized in the analog-to-digital converter 11. The digital output representing a line of a frame of video is stored in a buffer 12. The line is operated on by a block encoder which splits it into blocks or matrices of, for example, 3×3 or 9 pixels; i.e., nine two-color picture elements having a digital luminance value and a bit map digit indicating which of two colors A or B describe the pixel. The block coding method is predicated on the premise that there is a finite quantity of non-redundant elements existing within a block—namely, Two—that are designated color A and color B. A bit-map of the matrix is generated with one bit per pixel. If the bit in the bit map is a 1 then that pixel is color A and if a 0, the pixel is color B. Thus, each block initially consists of 3 elements of information: Color A, Color B, and a Bit map. The size of these elements of information depend on (a) the required color accuracy and (b) the number of pixels in the matrix. For example, if 15 bits of color accuracy is required in a system using the invention, and a matrix size of 3×3 elements, (15×2)+9 (i.e., one bit per pixel)=39 bits of information for each block. Since there are 9 pixels in the matrix, this would be 39 divided by 9 which is a compression equal to 4 and ⅓ bits per pixel. Since there are in a television frame 240×500 picture elements, there would be 13,333 blocks per TV field. Other matrix block sizes are easily implemented with comparable results.

Figure 2:
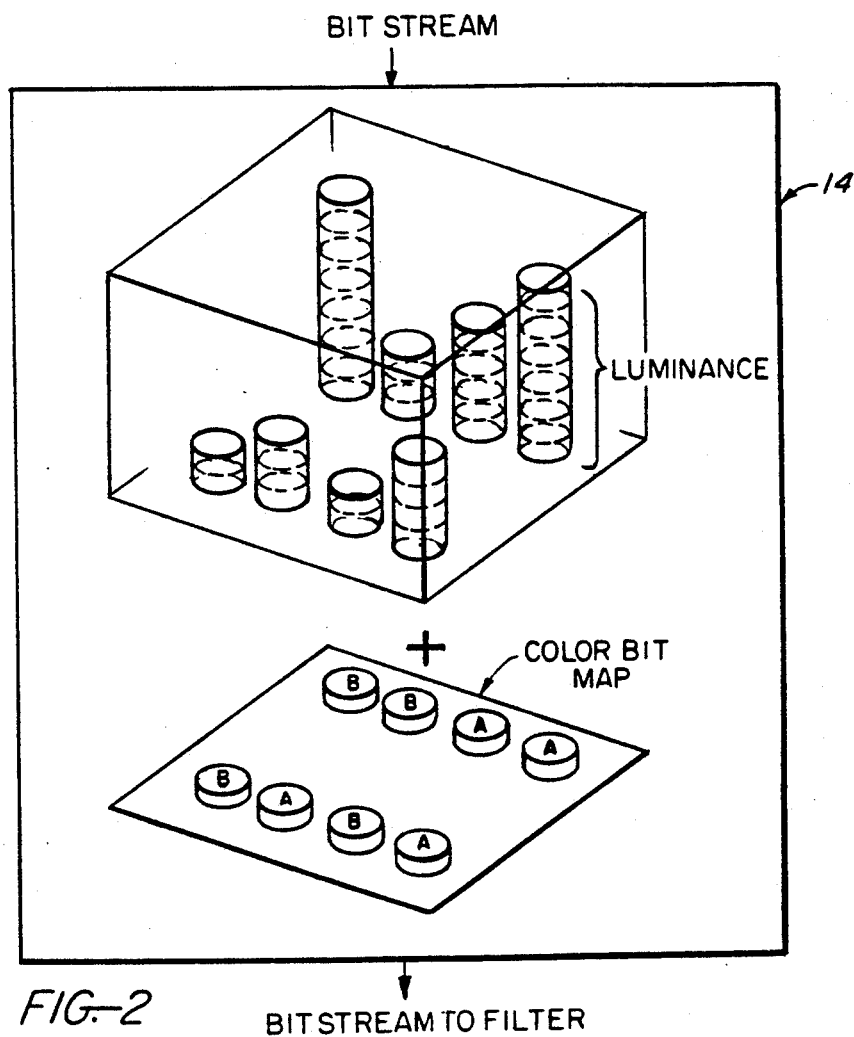
FIG. 2 is a drawing of the block encoder illustrating the method for encoding the color pixels of a digitized television signal and the bit map encoding.

Reference is now directed to FIG. 2 which is a three dimensional representation of the block encoder showing a 2×4 matrix or pixel block 14 and including the Bit Map showing whether the corresponding pixel is color A or color B in the novel two-color+Bit Map encoder. The attributes of each pixel are encoded into the digital word represented by its height or digital length in accordance with the Format shown in FIG. 3. These include the color designation, A or B, the difference from the corresponding pixel in the previous frame, and in the previous block. Note that, since there are in a television frame 240×500 picture elements, there would be 15,000 of the 2×4 blocks per TV field. A digital word is added indicating the pixel luminance or color value.

The Bit Map also can have variable height since it encodes a variable word length designating which one of five groups of map patterns a block belongs in, according to the probability of occurrence distribution of specific map patterns.

After block encoding, the block data per block and per frame is transferred to memory 15 where it is delayed one frame time and resides as the Previous frame and is then filtered in temporal filter 16 which is a time variant impulse response filter. The inter-frame filter 16 functions to reduce noise that can cause blurring of edges in imaging data. These edge effects are caused by noise voltages that have an additive effect on the luminance value of the color pixels. After the filter 16, the current frame memory 17 and the previous frame memory 15 are interrogated and differenced by the compressor 18 for frame and block redundancy. In the inter-frame comparison, each coded block is compared to the corresponding block in the previous frame. Each block is marked with a single bit that defines if it will be a new block or if it is unchanged from the previous block. This process creates the frame BitMap with one bit per block. The BitMaps per frame are differenced in the inter-frame comparison. This frame bit map is further compressible because it contains contiguous areas of change and contiguous areas where there is no change. Thus we have relatively long runs of 1's and relatively long runs of 0's. Run Length Coding of the frame bit map produces 0.5 to 0.8 bits per block.

Reference is now directed to the Format for compression of the block encoded data, FIG. 3. In the compressor 18, FIG. 1, the information describing the blocks that are marked as New is further compressed. The information in each block is Color A, color B, and BitMap.

In the first step it is determined if color B=color A. If so, there is no need to encode color B and further, if the two colors are equal, there is no need to encode the BitMap because this condition means the BitMap is all 0's.

In the next step, it is determined if the color value to be encoded meets the following criterion:

$$\frac{(Rc + Gc + Bc)}{(Rp + Gp + Bp)} \times Rp = Rc$$

$$\frac{(Rc + Gc + Bc)}{(Rp + Gp + Bp)} \times Gp = Gc$$

$$\frac{(Rc + Gc + Bc)}{(Rp + Gp + Bp)} \times Bp = Bc$$

where:

Rc, Gc, and Bc are the current Red, Green, and Blue values Rp, Gp, and Bp are the previous Red, Green, and Blue values.

These computations are made with Rp, Gp and Bp being the color values both from the previous frame and from the previous block. If the colors do meet the above criterion AND further, if the difference (Rc+Gc+Bc)−(Rp+Gp+Bp) is small, then the current color value is encoded as the DIFFERENCE to the previous value—either previous frame, or previous block.

With reference to FIG. 3, the variable bit length coding scheme for the BitMap is based on the "expected frequency of occurrence" distribution. For example, the specific BitMap patterns encoded in Group A are expected to occur much more frequently than those patterns in Group B. Group B patterns occur more frequently than Group C, etc. Thus, the average number of encoded bits to represent the BitMap is smaller than the number of bits in the BitMap.

The minimum number of bits required to encode a single block is 9:

Difference color A (7 bits)+No color B, No BitMap (2).

The maximum number of bits required to encode a single block is 46:

(16+17+13)

Actual experimental results, using a wide variety of video images result in an average of about 20 bits per block for both a 2×4 and a 3×3 block size, or about 2.3 bits per pixel.

When the frame-to-frame correlation is high, block correlation to the previous frame is high and the number of encoded blocks is small. When frame-to-frame correlation is low, block correlation to the previous block (intra-frame) is high and the number of encoded bits per frame of video range from as much as 200,000 (uncorrelated frames of high detail) to as little as 25,000 (high inter-frame correlation and relatively low detail).

Referring back to FIG. 1, the digital video color signal emanating from the compressor 18 is composed of the lowest number of bits required to faithfully reproduce the R G B input signal when transmitted over a host bus 19 which may be a hard wire link to other equipment in a video control system such as in the aircraft and missile technologies or in transmitting images over telephone lines where the bit rate must be low to prevent degradation of high frequency portions of the images transmitted.

FIG. 4 is a set of diagrams illustrating the concept of the novel block coding procedure. The block coding scheme is predicated on the premise that there is a finite quantity of non-redundant elements within the block; i.e., TWO These we designate Color A and Color B. Furthermore, a Bit Map of the matrix is generated with one bit per pixel. If the bit in the Bit Map is a 1, then that pixel is color A and if a 0, then the pixel is color B. Thus, each block initially consists of 3 elements of information: Color A, Color B and a BitMap. The size of these elements of information depends on (1) the required color accuracy;
(2) the number of pixels in the matrix.

If 15 bits of color accuracy is required and a matrix size of 3×3, there would be (15×2)+9=39 bits of information for each block. Since there are 9 pixels in this example, this would be 39/9=4⅓ bits per pixel.

The premise that there can only be a maximum of two non-redundant elements in the block is verified by examining the maximum expected frequency components within the block. This is most easily understood by examining the impulse response on a single axis. For example, if 3 successive samples (a, b, c) on the horizontal axis in each of three cases are examined:

In case 1 and 2 of FIG. 4 the premise is valid but the premise would not be valid for case 3. However, if the sample rate is 2× the highest frequency component, Case 3 would be encountered. Exactly the same analysis would hold if three vertical samples were examined.

Referring now to FIG. 5, assuming an intersection of four different colors within the block, as shown, there could be four color elements in a single block. Since the premise only allows TWO colors, it is clear that two of the four colors will be distorted. The methodology for characterizing the TWO colors insures minimum distortion in luminosity domain and it is well known that the human eye is not sensitive to high frequency color information, such as would be the case in FIG. 5. Thus, the visible distortion caused by the block encoding algorithm is minimal.

Therefore, the block coding algorithm that only permits TWO colors to exist in any block is based on the assumption that any resulting distortion from this assumption is acceptable.

Various block sizes (2×2, 3×2, 4×2, 2×3, 3×3, 4×3, 2×4, 3×4 and 4×4) have been modeled with the actual video images encoded and decoded to observe the visual results of the distortion. Smaller block sizes result in less distortion but produce less coding efficiency. Using the values cited earlier for a 3×3 block which produces $4\frac{1}{3}$ bits per pixel, a 2×2 block would produce $((2\times 15)+4)/4=8\frac{1}{2}$ bits per pixel.

If the block coding scheme were the only element used, the tradeoff of efficiency vs. distortion could be made on its own merits. However, because of subsequent intra-frame and inter-frame coding techniques, a smaller block size can be closely as efficient as larger block sizes. After intra-frame and inter-frame redundancies are characterized, the difference in coding efficiency vs. block size is only slight.

Referring back to the inter-frame filter 16, FIG. 1, the function of this filter and its novelty is discussed as follows.

After block coding, and before Intra-Frame comparison, the block coded (color A and color B) information goes through this filter 16. This filter is best described as a time variant, impulse response filter. The purpose of the filter 16 is the reduction of noise. The filter algorithm is:

```
IF abs(Newsample − StoredValue) < Threshold, THEN
    BlockColor = (coX * Newsample) + (coY * StoredValue)
    where:
        coX + coY = 1
        coX/coY is time invariant
        coX/coY = 1 at time 0
        coX/coY < 1 and > 0 at time N
        StoredValue for Frame N = BlockColor
            for Frame N − 1
ELSE BlockColor = Newsample
```

A practical implementation of this algorithm was produced using a stored count value for each color in each block. The total number of stored counts is 2×number of blocks. As each new block is coded, the color values are compared to the stored value. If the difference exceeds a threshold, then the new value is simply stored and the count value is reset to 0.

If the difference does not exceed the threshold, then the count value, i.e., the number of frames, is used to index into a table to find coX and coY. These coefficients are then multiplied by the new sample and stored value, these products are added and then stored as the filtered value. Finally it the count has not reached a predetermined maximum, the count is incremented.

In this manner, each color in each block has its own time variant coefficients. Furthermore, edges are not smeared because when the new block color exceeds a threshold it immediately becomes the current value and the time variant coefficients are started again from 0.

Reference is now directed to FIG. 6 which shows the functional flow diagram of the decompressor-decoder. Basically, it is the reverse order of the encoder-compressor. The decompressor 21 involves reconstructing each frame from the frame BitMap and placing it into frame memory 22; then block BitMap is used to decode the color values with reference to a look-up table in the block decoder 23. This is done on a line basis and the result stored in a line buffer 24 which memorizes the previous line for applying error correction algorithms in the reconstructor 25. The output of the reconstructor is digital-to-analog converted to recover the R G B colored sequential video frame signal.

A further compression, of data may be employed in the compression stage 18 in which a current color is compared with color in a previous block or in a previous frame. In this scheme, the current individual RGB color changes are not encoded. Instead, the difference of the sums of the current and previous RGB values are encoded. For example, as shown below, the RGB values are compared and the values summed. If the ratio of the sums multiplied by the previous value is within an established tolerance, the current RGB values are not encoded; only the difference of the sums is encoded, further compressing the amount of data to be transmitted.

|     | Previous | Current | Ratio of sums × Previous (calculated color) |
|-----|----------|---------|---------------------------------------------|
| R   | 15       | 20      | 18.75                                       |
| G   | 20       | 25      | 25                                          |
| B   | 25       | 30      | 31.25                                       |
| Sum | 60       | 75      |                                             |

The procedure is:
Take the ratio of the sums (75/60=1.25);
Multiply individual RGB colors by the ratio of sums;
Compare the calculated color to the actual color;
Based on allowable error, encode the difference (75−60) or 15.

This compression technique is based on empirical data that indicates that, about 90% of the time, the ratio of the sums will be equal to the ratio of the individual color changes.

If the calculated color is outside the allowable error tolerance, the current individual RGB color values are encoded.

Although particular embodiments of the invention have been described and illustrated herein, it is recognized that modifications and variations may readily occur to those skilled in the art and consequently, it is intended that the claims be interpreted to cover such modifications and equivalents.

The inventor claims:

1. A data encoder-compressor for color video imaging systems, wherein an analog video data stream is digitized and block-encoded into matrices of pixels in two-color elements with luminance, and bit mapping in groups of variable bit length for further compressing the video data by differencing present frame and previous frame, and differencing present block and previous block, for reducing the amount of data for real time transmission and reproduction of the image over narrow bandwidth links, said encoder-compressor comprising:, means for block coding said data stream into sequential matrices of pixels, each pixel represented being by a digital word defining the color value of a first and a second reference color with bit map;

means for finding, characterizing and coding non-redundant information in said blocks of said encoded data;

means for inter-frame comparison of each block with the corresponding block in the previous frame to determine if it is unchanged from the previous block or designated a new block;

means for compressing blocks that are designated new blocks by determining if said first reference color equals said second reference color, and deleting the bitmap when there is no difference; and means for compression where the current R, G, B colors compared to the corresponding colors of the previous frame or block multiplied by the previous block colors equals the current block colors or, if the difference is small, encoding the current color value as the difference;

whereby an analog video signal is encoded and compressed to lower the bit rate for transmission over narrow channels.

2. A data encoder-compressor for color video imaging systems as described in claim 1, further comprising an inter-frame filter for reducing noise, said filter comprising:

a stored count memory for storing each color in each block, the total number of stored counts being twice the number of blocks;

means for comparing the current color values to the stored value in said stored count memory to produce a difference;

means for establishing a decision threshold value;

decision means comparing said difference output of said comparing means and said threshold value to produce a new value;

means for storing the new value from said decision means and reseting the count value to 0;

means storing a table of values to find coefficients X and Y;

means for indexing a table;

means for multiplying said coefficients by the new sample and the stored value to produce products;

means for adding and storing the products as the filtered value; and means for incrementing the count if the count has not reached a pre-determined maximum;

whereby each color in each block has its own time invariant coefficients and when the new block color exceeds a threshold it immediately becomes the current value and the time variant coefficients are started again from zero.

3. A data encoder-compressor for color video imaging systems as defined in claim 1, wherein said means for inter-frame comparison of each block with the corresponding block in the previous frame to determine if it is unchanged from the previous block or designated a new block, comprises:

means for marking each of said blocks with a single bit that defines if it will be a new block or if it is unchanged from the previous block, thus creating a frame bit map having one bit per block; and comparator means for comparing said frame bit maps of current and previous frames to determine run lengths of the same and different blocks.

4. A decompressor-decoder for a frame sequential color video transmission system including an encoder-compressor according to claim 1, comprising:

means for interpreting the bits of the block codes to determine the block, bit map and frame encoding of the block encoded data, means for extracting the color information and bit map data from the block codes receiving the block encoded data from said interpreting means, means for converting color information using look-up tables to convert the extracted color and bit map information into numerical values, means for applying the numerical color values to the individual pixels of each block in accordance with the numerical bit map data, and digital to analog converter means receiving the digital pixel data including the numerical color values and frame data, and converting the sequential frames to an analog television signal.

5. The method for coding and compressing color video signals for transmission at lowered bit rates which comprises the steps of:

digitizing the analog signal and coding the signal into blocks of pixel matrices for manipulation of pixels;

finding, characterizing and coding non-redundant information in said blocks of said encoded data;

comparing each block with the corresponding block in the previous frame to determine if it is unchanged from the previous block or designated a new block;

compressing blocks that are designated new blocks by determining if said first reference color equals said second reference color, and deleting the bit map when there is no difference; and compressing blocks and frames where the current R, G, B colors compared to the corresponding colors of the previous frame or block multiplied by the previous block colors equals the current block colors or, if the difference is small, encoding the current color value as the difference;

whereby the resulting digital signal can be terminated for loading onto a transmission line or a carrier signal for transmission.

6. A method for decompressing and decoding digital data that have been coded and compressed according to claim 5, comprising the steps of:

interpreting the bits of the block codes to determine the particular type of encoding of the block encoded data, extracting the color information and bit map data from the block codes, using look-up tables to convert the extracted color and bit map information into numerical values, applying the numerical color values to the individual pixels of each block in accordance with the numerical bit map data, and sending the resulting digital pixel data to a digital-to-analog converter for conversion into real-time analog video signals.

7. The method for inter-frame noise reduction filtering of block coded video color data in a video transmission system, comprising the steps of:

storing the count for each color in each block;

comparing each new coded block to the stored value to determine the difference;
establishing a threshold value;
subtracting the difference from the threshold to obtain a new value;
storing the new value and resetting the counter; or
if the value is less than the threshold value,
indexing into a table from the frame count value to find coefficients;
multiplying the coefficients by the new sample and the stored value to obtain the products thereof;
adding the products to obtain the filtered value;
establishing a predetermined maximum value for the count;
comparing the filtered value with the maximum value; and
incrementing the count if the count has not reached said value;
whereby each color in each block has its own time invariant coefficients and when the new block color exceeds a threshold it immediately becomes the current value and the time variant coefficients are started again from zero.

8. The method for block coding an RGB frame sequential video data stream, which comprises:
sampling and digitizing the video data stream;
forming the sampled digitized video frame data into matrix blocks of two-color, A or B pixels having luminance value information; and
forming a map of the position in the block of A and B color pixels by assigning bit O for color A and 1 for color B for each pixel in the block.

9. In a color video communications system wherein an analog television signal is digitized by line and frame, and encoded and compressed to remove redundant information, before transmission, and decompressed and decoded at the receiver, the improvement which comprises:
means for block encoding said digitized television signal into blocks of pixels, each pixel having one of two reference RGB combination colors, a first reference color A and a second reference color B, and having a luminance value, and encoding a bit map of the pixels in each block, said encoding means having an output;
storage means for storing the blocks of at least one previous frame connected to the output of said encoding means;
means for compressing the output of said block encoding means, consisting of:
means for inter-frame comparison of each current block with the spatially corresponding block in the previous frame for designating a block as new, connected to said encoder means output and to said storage means and having an output designating a current block as new;
means for color comparison of the new block received from said interframe comparison with the previous block for determining if the reference colors equal the previous block colors, and deleting the bit map when there is no difference;
means for color comparison of the new block with the previous block and the previous frame to determine if the difference is within a tolerance limit and encoding the current color value as the difference of the sums of the RGB color values of current and previous color values, producing compressed digital output; and
means for receiving, decompressing, decoding reconstructing and D/A converting the compressed digital output;
whereby the analog RGB television signal is compressed to reduce the transmission bit rate for hard wire television links.

* * * * *